(12) United States Patent  (10) Patent No.: US 8,705,737 B2
Suzuki  (45) Date of Patent: Apr. 22, 2014

(54) VIDEO TRANSMISSION METHOD, VIDEO TRANSMISSION SYSTEM, AND VIDEO PROCESSING APPARATUS

(75) Inventor: Kazuyoshi Suzuki, Tokyo (JP)

(73) Assignee: Sony Corporation, Tokyo (JP)

(*) Notice: Subject to any disclaimer, the term of this patent is extended or adjusted under 35 U.S.C. 154(b) by 1012 days.

(21) Appl. No.: 11/876,470

(22) Filed: Oct. 22, 2007

(65) Prior Publication Data

US 2008/0120674 A1   May 22, 2008

(30) Foreign Application Priority Data

Nov. 20, 2006  (JP) ................ P2006-313280

(51) Int. Cl.
*H04L 29/06* (2006.01)
(52) U.S. Cl.
USPC ............ 380/203; 380/200; 380/201; 380/202
(58) Field of Classification Search
USPC .................. 380/203, 200, 201, 202
See application file for complete search history.

(56) References Cited

U.S. PATENT DOCUMENTS

| | | | | |
|---|---|---|---|---|
| 6,157,330 A * | 12/2000 | Bruekers et al. | ............... | 341/143 |
| 6,373,960 B1 * | 4/2002 | Conover et al. | ............... | 382/100 |
| 6,643,386 B1 * | 11/2003 | Foster | ............................ | 382/100 |
| 6,983,057 B1 * | 1/2006 | Ho et al. | ......................... | 382/100 |
| 7,027,614 B2 * | 4/2006 | Reed | ............................. | 382/100 |
| 2002/0021824 A1 * | 2/2002 | Reed et al. | .................... | 382/100 |
| 2003/0031318 A1 * | 2/2003 | Troyansky et al. | ........... | 380/202 |
| 2004/0234098 A1 * | 11/2004 | Reed | ............................. | 382/100 |
| 2004/0258243 A1 * | 12/2004 | Shin et al. | ..................... | 380/210 |
| 2005/0069167 A1 * | 3/2005 | Zarrabizadeh | ............... | 382/100 |
| 2005/0069168 A1 * | 3/2005 | Zarrabizadeh | ............... | 382/100 |
| 2005/0069169 A1 * | 3/2005 | Zarrabizadeh | ............... | 382/100 |
| 2005/0248688 A1 * | 11/2005 | Kimura et al. | ............... | 348/655 |
| 2006/0072780 A1 * | 4/2006 | Zarrabizadeh | ............... | 382/100 |
| 2009/0136083 A1 * | 5/2009 | Picard et al. | ................. | 382/100 |
| 2009/0220070 A1 * | 9/2009 | Picard et al. | ................... | 380/28 |

FOREIGN PATENT DOCUMENTS

| | | |
|---|---|---|
| JP | 11-331622 | 11/1999 |
| JP | 2001-326805 | 11/2001 |
| JP | 2006-146426 | 6/2006 |

* cited by examiner

*Primary Examiner* — Bradley Holder
(74) *Attorney, Agent, or Firm* — Finnegan, Henderson, Farabow, Garrett & Dunner, L.L.P.

(57) ABSTRACT

Disclosed herein is a video processing apparatus for generating video data capable of representing a color gamut beyond a first color gamut specified by a predetermined requirement. The video processing apparatus includes: a detector detecting, from the video data, a section corresponding to video of a color gamut beyond the first color gamut; a supplemental-data generator generating supplemental data pertaining to the video data; and an embedding unit embedding the supplemental data generated by the supplemental-data generator in the section detected by the detector, with a change to a color beyond the first color gamut, the color having substantially a same hue as that of video to be represented.

13 Claims, 9 Drawing Sheets

CONCEPTUAL DIAGRAM OF COLOR SPACE, sRGB, AND xvYCC

F I G . 9
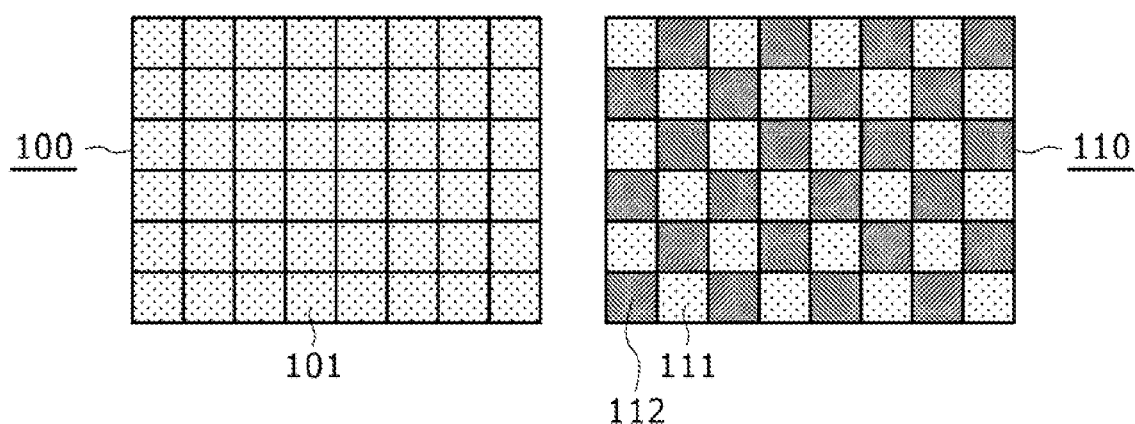

though the HDMI interface, it is important to protect its copyright. Methods for transmitting copyright protection data include a method of transmitting copyright protection data as control data and a method of embedding copyright protection data in video itself indicated by video data, each having advantages and disadvantages. In the case where copyright protection data is transmitted through the use of control data added to video data, a modification is not made to the video data itself, so that the quality of the video data is advantageously maintained. However, if the control data can be separated from the video data, the copyright protection data is removed from the video data and therefore becomes ineffective. Further, if copyright protection data is newly added, the amount of data pertaining to the video data increases, which disadvantageously increases the amount of transmission data.

VIDEO TRANSMISSION METHOD, VIDEO TRANSMISSION SYSTEM, AND VIDEO PROCESSING APPARATUS

CROSS REFERENCES TO RELATED APPLICATIONS

The present invention contains subject matter related to Japanese Patent Application JP 2006-313280 filed in the Japanese Patent Office on Nov. 20, 2006, the entire contents of which being incorporated herein by reference.

BACKGROUND OF THE INVENTION

1. Field of the Invention

The present invention relates to a video transmission method and a video transmission system suitable when applied to a digital audio/video input/output interface standard referred to as an HDMI (High-Definition Multimedia Interface) standard and to a video processing apparatus applied to the transmission system.

2. Description of the Related Art

In recent years, an HDMI standard has been developed as an interface standard for transmitting uncompressed digital video data and the like among a plurality of video devices. The HDMI standard is a standard for transmitting video data, as each primary color data, individually on a pixel-by-pixel basis. Audio data is transmitted in the blanking period of the video data through the use of the transmission line of the video data. In the transmission of primary color data, three-channel primary color data (R data, G data, B data) of an additive color mixture may be transmitted, or luminance and color-difference signals of Y, Cb, and Cr may be transmitted.

According to the HDMI interface, control data and a pixel clock are transmitted through the use of different channels from a channel for transmitting video data. The control data can be not only transmitted from a video data sending device (source device) to a receiving device (sink device), but also transmitted from the receiving device (sink device) to the sending device (source device). The source device encrypts 8-bit data at a time, and the sink device decrypts the 8-bit data at a time.

WO2002/078336 describes the details of the HDMI standard.

SUMMARY OF THE INVENTION

In the case of transmitting content such as video data through the HDMI interface, it is important to protect its copyright. Methods for transmitting copyright protection data include a method of transmitting copyright protection data as control data and a method of embedding copyright protection data in video itself indicated by video data, each having advantages and disadvantages. In the case where copyright protection data is transmitted through the use of control data added to video data, a modification is not made to the video data itself, so that the quality of the video data is advantageously maintained. However, if the control data can be separated from the video data, the copyright protection data is removed from the video data and therefore becomes ineffective. Further, if copyright protection data is newly added, the amount of data pertaining to the video data increases, which disadvantageously increases the amount of transmission data.

On the other hand, the method of embedding copyright protection data as a watermark in video data itself makes it difficult for the copyright protection data to be removed from the video data, and thus enhances the effect of copyright protection. However, the embedment of the data may degrade the quality of transmission video data itself, so that there is a problem that only such relatively simple data that does not affect the display video can be embedded.

In view of the above circumstance, it is desirable to excellently transmit various kinds of supplemental data, such as copyright protection data, pertaining to video data, using a video data transmission standard such as the HDMI standard.

According to an embodiment of the present invention, in the case of transmitting video data capable of representing a color gamut beyond a first color gamut specified by a predetermined requirement, a sending device detects a section corresponding to video of a color gamut beyond the first color gamut from the video data. The sending device then generates video data by embedding supplemental data pertaining to the video data in the detected section corresponding to the video of the color gamut beyond the first color gamut, with a change to a color beyond the first color gamut, the color having substantially a same hue as that of video to be represented. A receiving device detects a change in color in the section corresponding to the video of the color gamut beyond the first color gamut contained in the transmitted video data, and detects the supplemental data based on the detected change.

With this, supplemental data to video data is transmitted with a change in color beyond a specified color gamut, and supplemental data to video data at least within the specified color gamut can be transmitted without degrading video quality.

According to an embodiment of the invention as described, supplemental data to video data is transmitted with a change in color beyond a specified color gamut, and supplemental data to video data at least within the specified color gamut can be transmitted without degrading video quality. Accordingly, various kinds of supplemental data such as copyright protection data can be excellently transmitted without increasing the amount of transmission data. In the case of a display apparatus capable of displaying colors only within the specified color gamut, the supplemental data does not degrade display video. In the case of a display apparatus capable of displaying colors beyond the specified color gamut, the supplemental data slightly degrades display video. However, the degradation of display video due to the supplemental data can be inconspicuous because of the change to a color in a region beyond a basic-color representing region, the color having substantially the same hue as that of the original video.

BRIEF DESCRIPTION OF THE DRAWINGS

Embodiment(s) of the present invention will be described in detail based on the following figures, wherein:

FIG. 9 is an explanatory diagram showing an example of color displaying according to the another embodiment of the invention.

DESCRIPTION OF THE PREFERRED EMBODIMENTS

Hereinafter, an embodiment of the present invention will be described with reference to FIGS. 1 to 6.

This embodiment is applied to a transmission system for transmitting video data and the like from a source device to a sink device through an HDMI-compliant cable. Further, supplemental data to video data is embedded in the video data before transmitting the video data from the source device to the sink device.

First, a description will be made on the characteristics of video data transmitted in this embodiment before describing a specific transmission configuration. To transmit video data through the HDMI-compliant cable, primary color data (red data, green data, and blue data: so-called RGB data) may be transmitted, or luminance and color-difference signals of Y, Cb, and Cr may be transmitted.

Figure 4:
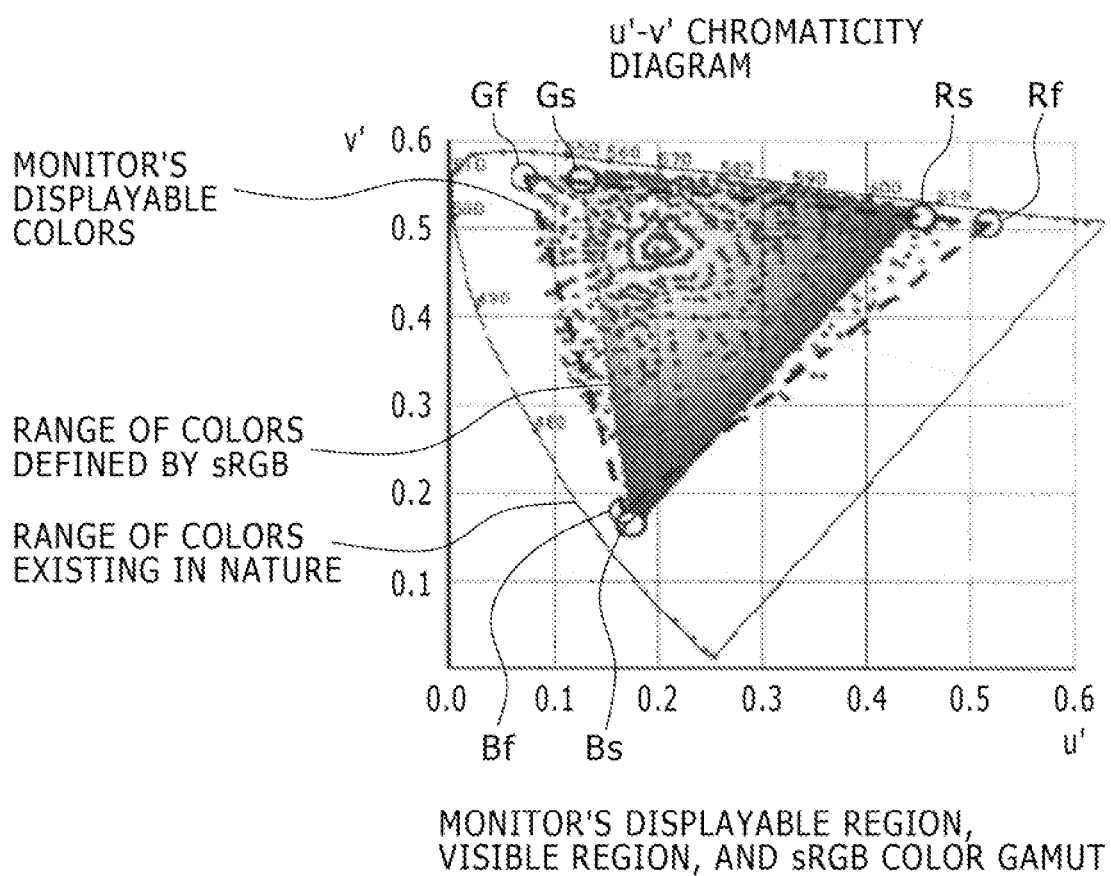
FIG. 4 is an explanatory diagram showing an example of the relationship between a display's displayable region and a color gamut represented by an sRGB signal, according to the embodiment of the invention.

FIG. 4 is a u'-v' chromaticity diagram, obtained by projecting a solid (color space), as to a display apparatus capable of receiving and displaying RGB data of primary color signals. In the chromaticity diagram, u' is the horizontal axis, and v' is the vertical axis. In FIG. 4, the range of colors existing in nature is shown by an outer fan shape. In FIG. 4, a color gamut that can be represented by normal RGB data is shown, for example, by a triangular range surrounded by three points Rs, Gs, and Bs. A color inside the triangle can be uniquely determined by giving a value expressed in the range of 0 to 1 to each primary color RGB in the case of an analog value. A displayable color gamut depends on where the three primary colors of RGB are arranged, as in an sRGB standard. A value expressed in the range of 0 to 1 in the case of an analog signal is indicated by, for example, an 8-bit quantized value in the case of a digital signal.

In the past, according to the characteristics of phosphors of cathode-ray tubes (CRT) used as display devices, the apexes of the triangle of the sRGB standard (chromaticity points of three primary colors) Rs, Gs, and Bs shown in FIG. 4 coincide substantially with three primary color points that can be represented by monitors. However, in recent years, various FPDs and projection monitors other than CRTs have been increasing, in which the color gamut that can be represented by monitors expands outside the color gamut specified by the sRGB standard, thus enabling the reproduction of a wider color gamut. For example, a color gamut surrounded by apexes Rf, Gf, and Bf and indicated by broken lines in FIG. 4 is an example of a color gamut that can be represented by an FPD.

As a moving image standard of the color gamut capable of reproducing these colors, an xvYCC standard has been developed. Each point in FIG. 4 indicates chromaticity existing in nature. As seen from FIG. 4, there are many cases where images contain colors beyond the color gamut that can be represented by the sRGB signal.

Figure 5:
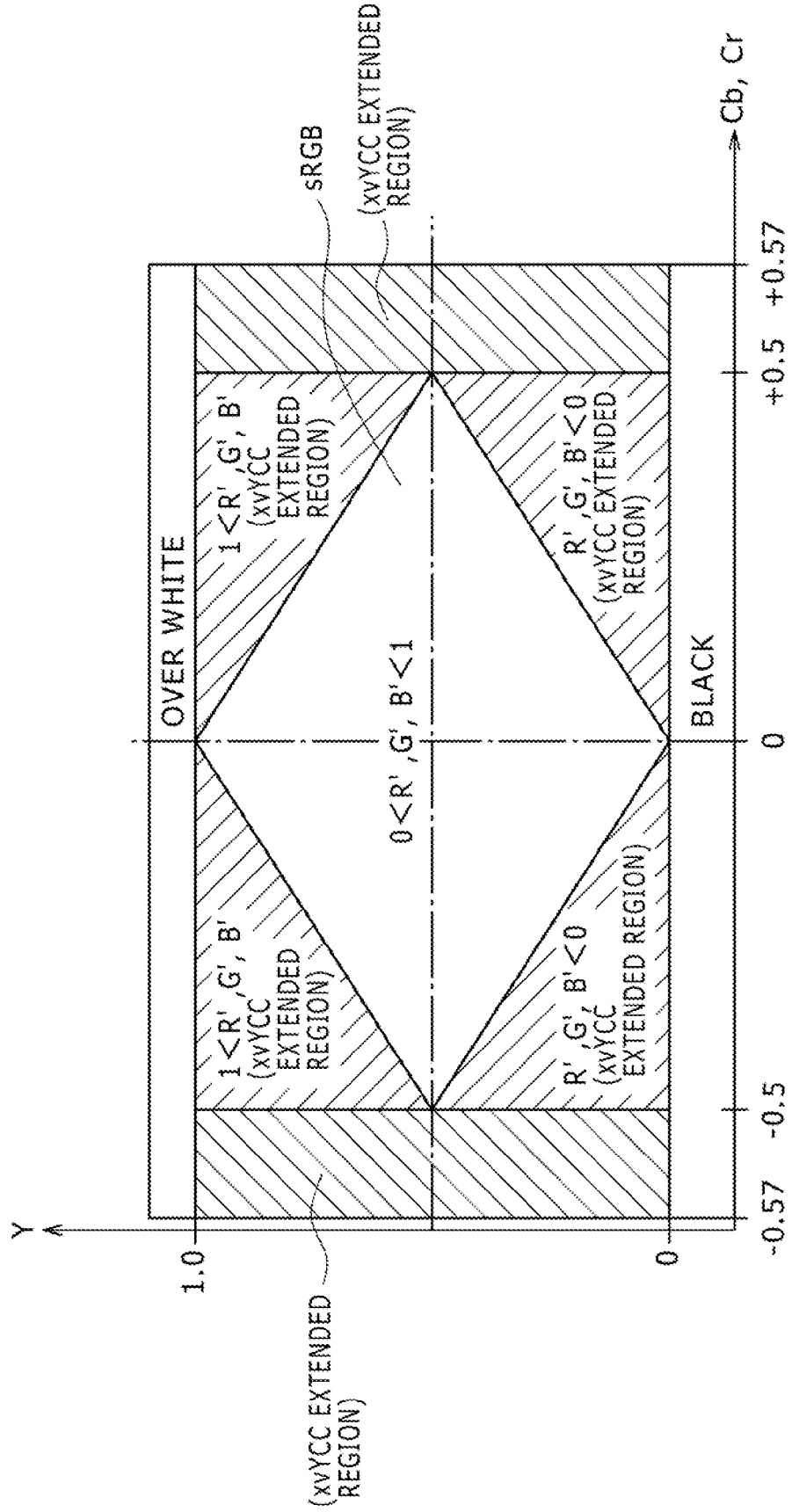
FIG. 5 is an explanatory diagram showing the color gamut relationship between an sRGB signal and an xvYCC signal.

FIG. 5 is a diagram showing the color gamut relationship between an xvYCC signal and an SRGB signal. In the diagram, the vertical axis indicates a luminance signal Y, and the horizontal axis indicates color-difference signals Cb, Cr. In the xvYCC standard, as shown in FIG. 5, while using the same primary-color points as those of the sRGB signal, the xvYCC signal is represented by a luminance signal Y and two color-difference signals Cb and Cr and standardized so as to include the color gamut of the sRGB signal. The xvYCC signal is represented by Y data, Cb data, and Cr data which are the luminance signal and the two color-difference signals, and can be converted through the following matrix into R data, G data, and B data which are the sRGB signal. Similarly, the xvYCC signal can be obtained from the sRGB signal through the inverse transformation. As shown in FIG. 5, the region of the sRGB signal is shown by a rhombus, which is surrounded by the extended region of the xvYCC signal. The color-difference signals Cb and Cr are expressed between −0.5 and +0.5.

$Y=0.2126R+0.7152G+0.0722B$ $Cb=-0.1146R-0.3854G+0.5000B$ $Cr=0.5000R-0.4542G-0.0458B$

Figure 6:
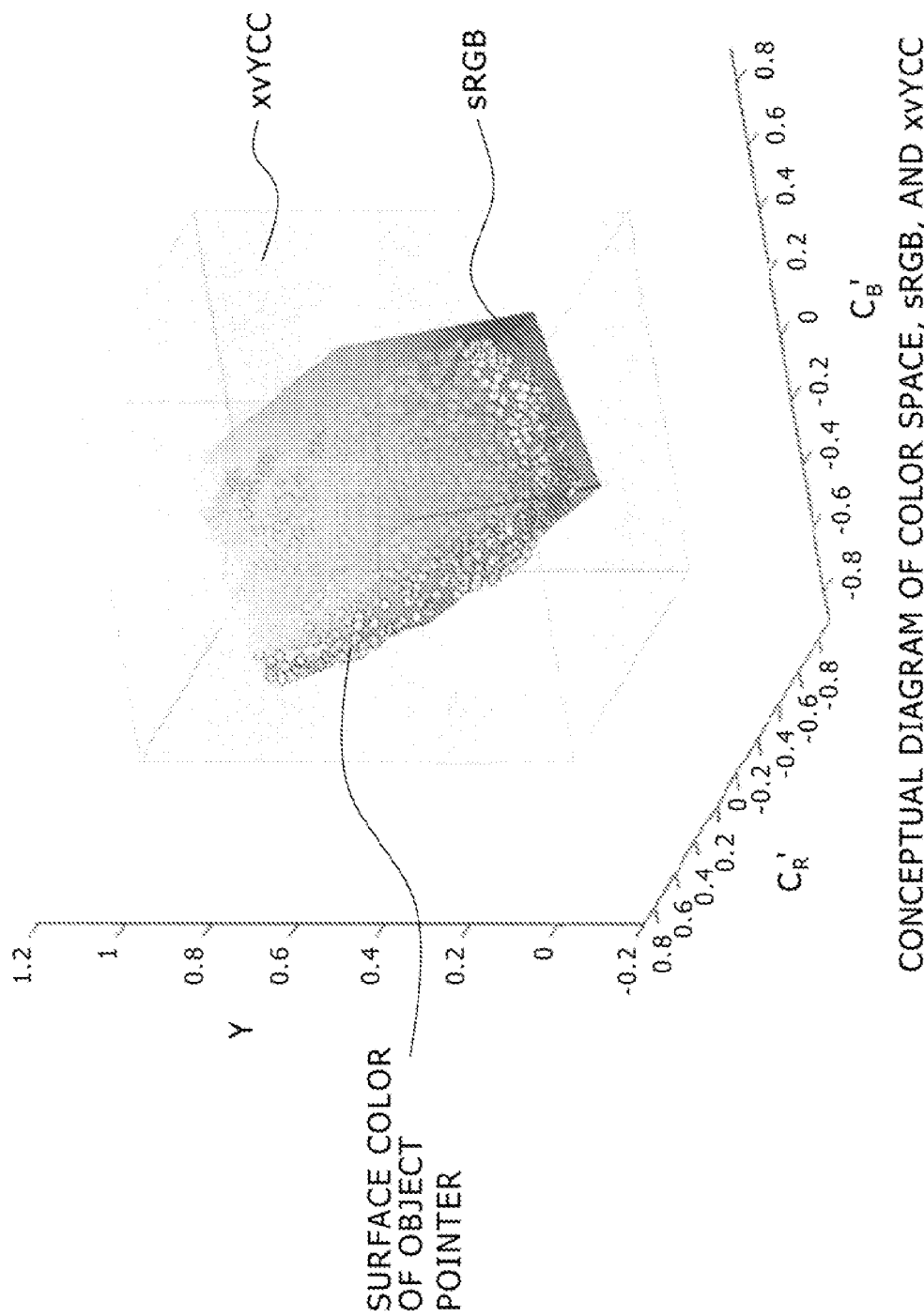
FIG. 6 is an explanatory diagram showing the color gamuts of the sRGB signal and the xvYCC signal in a color space.

FIG. 6 shows the color gamut of the sRGB signal and the color gamut of the xvYCC signal in a three-dimensional color space. As shown in FIG. 6, a rectangular hexahedron indicative of the color gamut of the sRGB signal is smaller than a rectangular hexahedron indicative of the color gamut of the xvYCC signal. Each point in FIG. 6 indicates chromaticity existing in video data of the xvYCC signal. A point located outside the rectangular hexahedron indicative of the color gamut of the sRGB signal is data in a region outside the sRGB signal.

In video devices mainly such as a television, video signals are recorded and transmitted based generally on the YCC system. Also in a DVD and a camera-integrated VCR, video signals are recorded in the form of color-difference signals. Also in the transmission of analog signals, composite and component signals are transmitted in the form of YCC color-difference signals and in the form of superposition thereof. Further, also in a digital interface such as HDMI, video signals are transmitted in the form of YCC color-difference signals (Y data, Cb data, Cr data). In a configuration in which transmission is performed in the form of YCC color-difference signals, namely, Y data, Cb data, and Cr data; data outside the color gamut of the sRGB signal can be transmitted, so that the color gamut of the xvYCC signal can be easily dealt with.

On the other hand, even in the case of transmission in the form of YCC color-difference signals, color gamuts of various kinds of video contained in existing broadcasts and package media such as a digital video and a DVD generally fall substantially within the color gamut of the sRGB signal. This is because camera filters are so designed and signal processing or editing is so performed after shooting that images fall within the color gamut of the sRGB signal so as to be displayed or reproduced in almost all video display devices mainly such as CRTs.

Thus, even in the case of transmitting YCC color-difference signals, a video signal component does not exist beyond the color gamut of the sRGB signal.

In view of this, according to this embodiment of the invention, in the case where a video signal having a wide color gamut beyond the color gamut of the sRGB signal can be transmitted, supplemental data such as a watermark is embedded in a color gamut beyond the color gamut of the sRGB signal, thus ensuring the transmission of the supplemental data and minimal effect of the embedded supplemental data on degradation in reproduced image quality.

Hereinafter, a description will be made on an example of the configuration in which supplemental data is embedded in a color gamut beyond the specified color gamut and transmitted.

Figure 1:
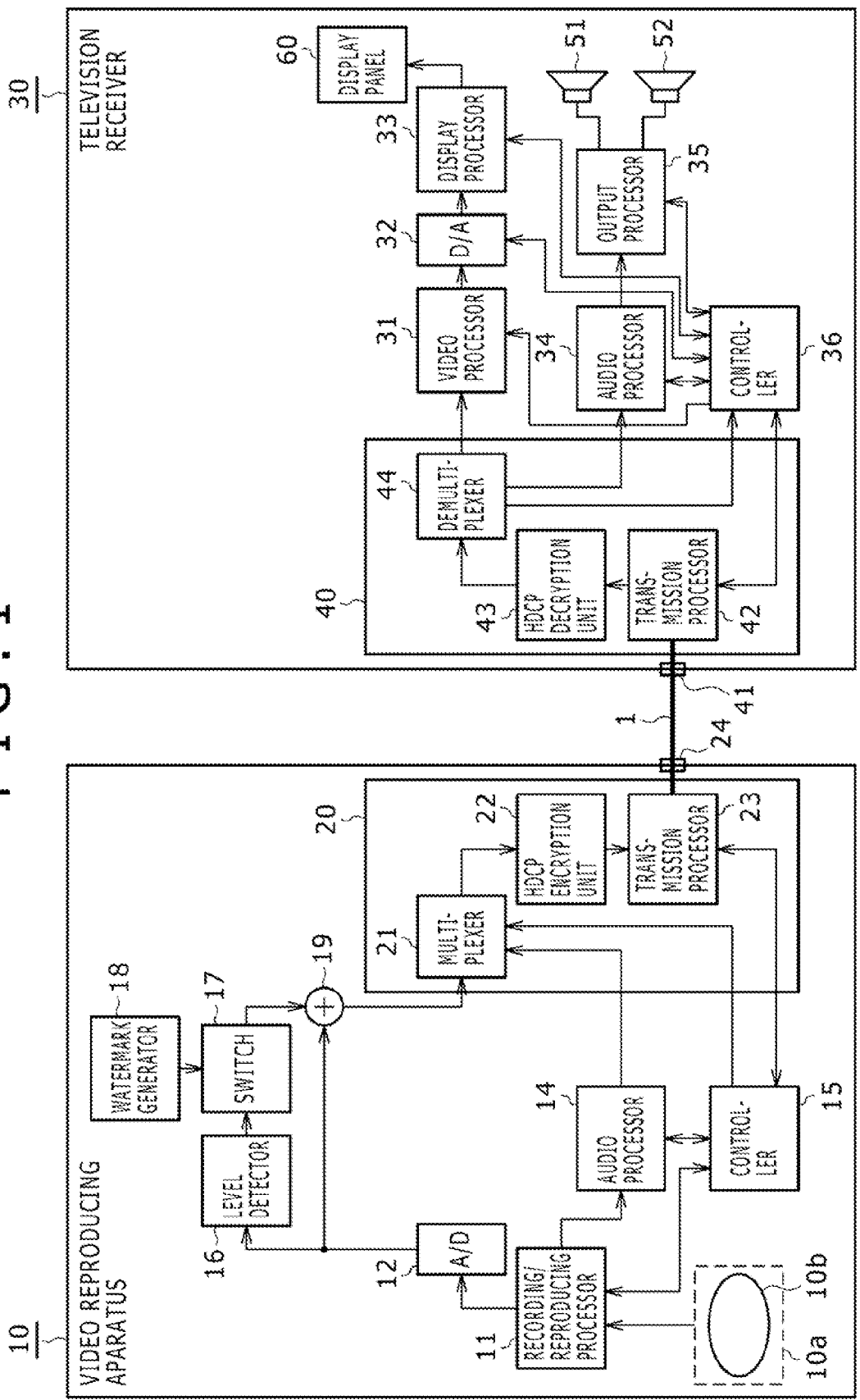
FIG. 1 is a block diagram showing an example of a system configuration according to an embodiment of the present invention.

FIG. 1 is a block diagram showing an example of a system configuration according to this embodiment. In this configuration, a video recording/reproducing apparatus 10 as a source device is connected to a television receiver 30 as a sink device through an HDMI cable 1, and video data and audio data are transmitted from the video recording/reproducing apparatus 10 to the television receiver 30. The video recording/reproducing apparatus 10 according to this embodiment can record and reproduce video data having a wide color gamut, and the television receiver 30 can perform display processing of video having a wide color gamut.

While a configuration necessary for an HDMI standard will be described below in order, the existing HDMI standard is basically applied as it is, and the configuration of the HDMI cable 1 is the same as in the past. In this embodiment, video signals are transmitted in the form of a luminance signal and color-difference signals, namely, YCC color-difference signals (Y data, Cb data, Cr data), using the HDMI cable 1.

First, a description will be made on the video recording/reproducing apparatus 10. The video recording/reproduction apparatus 10 includes a recording/reproducing unit 11 which can record and reproduce video data and audio data. For example, a hard disk drive (HDD) can be used as the recording/reproducing unit 11. Further, the recording/reproducing unit 11 can also play back a disk 10b (such as a DVD) mounted on a disk mounting unit 10a provided thereto. In the case where video data reproduced by the recording/reproducing unit 11 is an analog signal, it is supplied to an analog-to-digital converter 12 where it is converted into digital data composed of a luminance signal and color-difference signals for transmission processing. Reproduced audio data is supplied to an audio processor 14.

Video data digitized by the analog-to-digital converter 12 or digitized video data supplied from the recording/reproducing unit 11 is supplied to a level detector 16. If the color of a supplied section (area) is beyond the color gamut of the sRGB signal, the level detector 16 detects the supplied section (area). The color-difference signals of the detected section are supplied to a switch 17. The level detector 16 detects a section (area), continuing for a certain period in video data, corresponding to a color beyond the color gamut of the sRGB signal, and does not detect a section, having e.g. only one to several pixels, corresponding to a color beyond the color gamut of the sRGB signal.

The video recording/reproducing apparatus 10 also includes a watermark generator 18 which can generate a watermark for copyright protection and the like. In the watermark generator 18, a watermark to be generated may be prepared beforehand by storing it in a memory or the like. Alternatively, the watermark generator 18 may generate, by arithmetic processing, a watermark corresponding to copyright information required according to a condition.

When the level detector 16 detects a section of which color is beyond the color gamut of the sRGB signal, control is performed so that the switch 17 outputs a watermark prepared by the watermark generator 18 in the section supplied to the switch 17. The watermark outputted from the switch 17 is supplied to an adder 19 where it is added to a video signal supplied from the analog-to-digital converter 12 to generate transmission video data having the watermark added. According to the processing for adding the watermark, the watermark is added in the video, with a change to a color beyond the color gamut of the SRGB signal, the color having substantially the same hue as that of the video to be represented. In this context, "a change to a color having substantially the same hue" signifies changing a signal to a color on a line connecting desired color coordinates to color coordinates indicative of white in the chromaticity diagram. With this change, in the video data having the watermark added, the hue of the part where the watermark is added is similar to the original color.

The audio processor 14 processes reproduced or received audio data into transmission audio data.

Video data and audio data outputted from the adder 19 and the audio processor 14 are supplied to an HDMI transmission processor 20. The HDMI transmission processor 20 is a circuit for performing transmission processing of the HDMI interface, which is, for example, an integrated circuit. The video data and audio data supplied to the HDMI transmission processor 20 are multiplexed by a multiplexer 21.

Y data, Cb data, and Cr data of video data are transmitted, using e.g. 24 bits per pixel. Audio data is multiplexed so as to be transmitted using a blanking period of a channel for transmitting video data. The processing for transmitting audio data in a blanking period is a general transmission processing formatted according to the HDMI standard.

Transmission data multiplexed by the multiplexer 21 is encrypted by an HDCP encryption unit 22. The HDCP encryption unit 22 encrypts at least the channel of video data transmission, according to an HDCP (High-bandwidth Digital Content Protection System) standard. In the encryption, 8-bit data per channel is encrypted at a time. The 8-bit data transmission refers to the number of bits of data inputted by the sending device and the number of bits of data outputted by the receiving device. When data is transmitted according to the HDMI standard, transmission is performed according to a serial transmission system called TMDS (Transition Minimized Differential Signaling) in which 8-bit data is converted into 10-bit data which is transmitted to the receiving device through the cable, and the 10-bit data is converted into the 8-bit data in the receiving device.

Data encrypted by the HDCP encryption unit 22 is supplied to a transmission processor 23. Pixel data for each color is arranged in each individual channel, a clock and data are arranged in a pixel clock channel and a control data channel respectively, and they are sent out to the HDMI cable 1 connected to the HDMI terminal 24.

The HDMI cable 1 is connected to an HDMI terminal 41 of the television receiver 30.

Next, the configuration of the television receiver 30 will be described. Data transmitted through the HDMI cable 1 connected to the HDMI terminal 41 of the television receiver 30 is detected (received) in synchronization with a pixel clock, by a transmission processor 42 in an HDMI transmission processor 40. Detected data of each channel is decrypted by an HDCP decryption unit 43. In the decryption as well, 8-bit data per channel is decrypted at a time.

Decrypted data is supplied to a demultiplexer 44 where multiplexed data is demultiplexed into each channel. In the demultiplexing, audio data in the blanking period of the channel for transmitting video is separated from the video data.

Each video data demultiplexed by the demultiplexer 44 is supplied to a video processor 31. The video processor 31 performs various kinds of processing on transmitted video data. For example, the video processor 31 detects a watermark superimposed on the video data if necessary, and supplies the detected result to a controller 36. The watermark is detected based on a change in color beyond the color gamut of the sRGB signal.

Video data processed by the video processor 31 is supplied to a digital-to-analog converter 32 where it is converted into an analog video signal. The digital-to-analog converter 32, if necessary, converts a luminance signal and color-difference signals into primary color signals. The converted analog video signal is supplied to a display processor 33. The display processor 33 performs processing for driving a display panel 60.

Audio data demultiplexed by the demultiplexer 44 is supplied to an audio processor 34. The audio processor 34 performs audio processing such as analog conversion and supplies the processed output to an output processor 35. The output processor 35 performs processing such as amplification to drive speakers 51 and 52 connected to the output processor 35.

Control data demultiplexed by the demultiplexer 44 is supplied to the controller 36. Further, the controller 36 of the television receiver 30 can send control data to the controller 15 of the video recording/reproducing apparatus 10, using a channel for control data.

Figure 2:
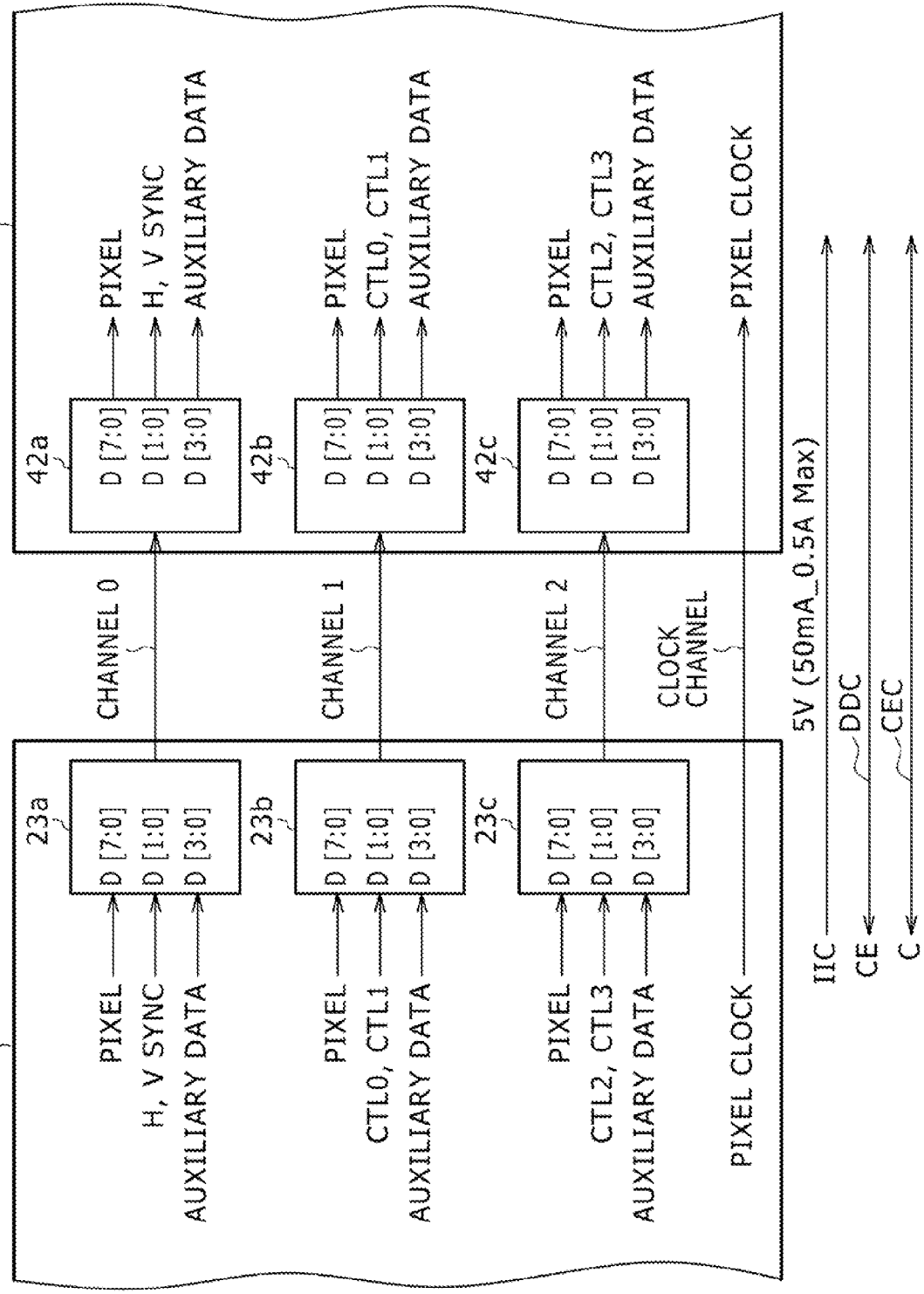
FIG. 2 is an explanatory diagram showing an example of a transmission channel configuration according to the embodiment of the invention.

FIG. 2 is a diagram showing an example of data configuration of each channel transmitted through the HDMI cable 1 between the transmission processor 23 of the video recording/reproducing apparatus 10 and the transmission processor 42 of the television receiver 30. As shown in FIG. 2, there are prepared three channels for transmitting video data which are channel 0, channel 1, and channel 2. Further, a clock channel for transmitting a pixel clock is prepared. One channel can transmit 8 bits per clock, so that Y data, Cb data, and Cr data for one pixel can be transmitted using 24 bits per clock in total of three channels. Further, there are prepared a DDC (Display Data Channel) line and a CEC (Consumer Electronics Control) line as control data transmitting channels. The DDC line is a transmission line for transmitting mainly display control data. The CEC line is a transmission line for mutually transmitting mainly device control data etc. between connected devices.

On the sending side, the channels for transmitting video data are provided with respective transmission processors (sending units) 23a, 23b, and 23c in the transmission processor 23. On the receiving side as well, the channels for transmitting video data are provided with respective transmission processors (data receiving units) 42a, 42b, and 42c in the transmission processor 42.

Now, the configuration of each channel will be described. Channel 0 transmits pixel data, vertical synchronization data, horizontal synchronization data, and auxiliary data. Channel 1 transmits pixel data, two kinds of control data (CTL0, CTL1), and auxiliary data. Channel 2 transmits pixel data, two kinds of control data (CTL2, CTL3), and auxiliary data.

Figure 3:
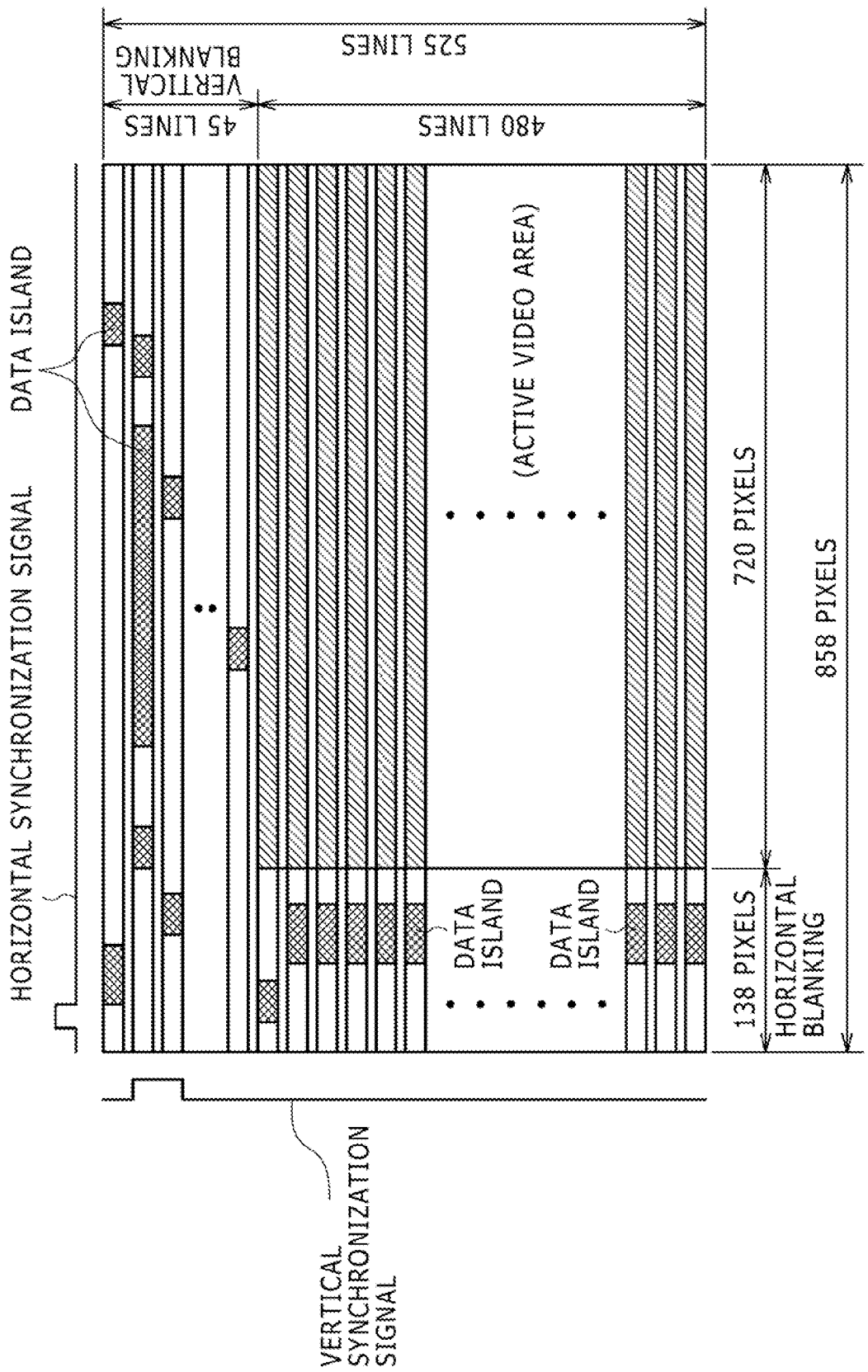
FIG. 3 is an explanatory diagram showing an example of a bit configuration according to the embodiment of the invention.

FIG. 3 is a diagram showing the pixel configuration and the line configuration of one frame in video data transmitted in the transmission configuration according to this embodiment. Video data (main video data) transmitted in this embodiment is uncompressed data (i.e., video data in units of pixels), and is provided with a vertical blanking period and a horizontal blanking period. More specifically, in the example of FIG. 3, a video display area (area shown as an active video area) contains pixel data of 480 lines×720 pixels. The number of lines and the number of pixels including the blanking periods are 525 lines and 858 pixels. Areas indicated by cross-hatching in the blanking periods are periods in which auxiliary data can be added, referred to as data islands.

With such transmission configuration, a watermark prepared by the watermark generator 18 in the source device 10 can be superimposed on video data to be transmitted to the sink device 30. In this case, if there is a section (area), continuing for a certain period, corresponding to a color beyond the color gamut of the sRGB signal; the watermark is superimposed in the section of the video data, with a change in color beyond the color gamut of the sRGB signal.

Figure 7:
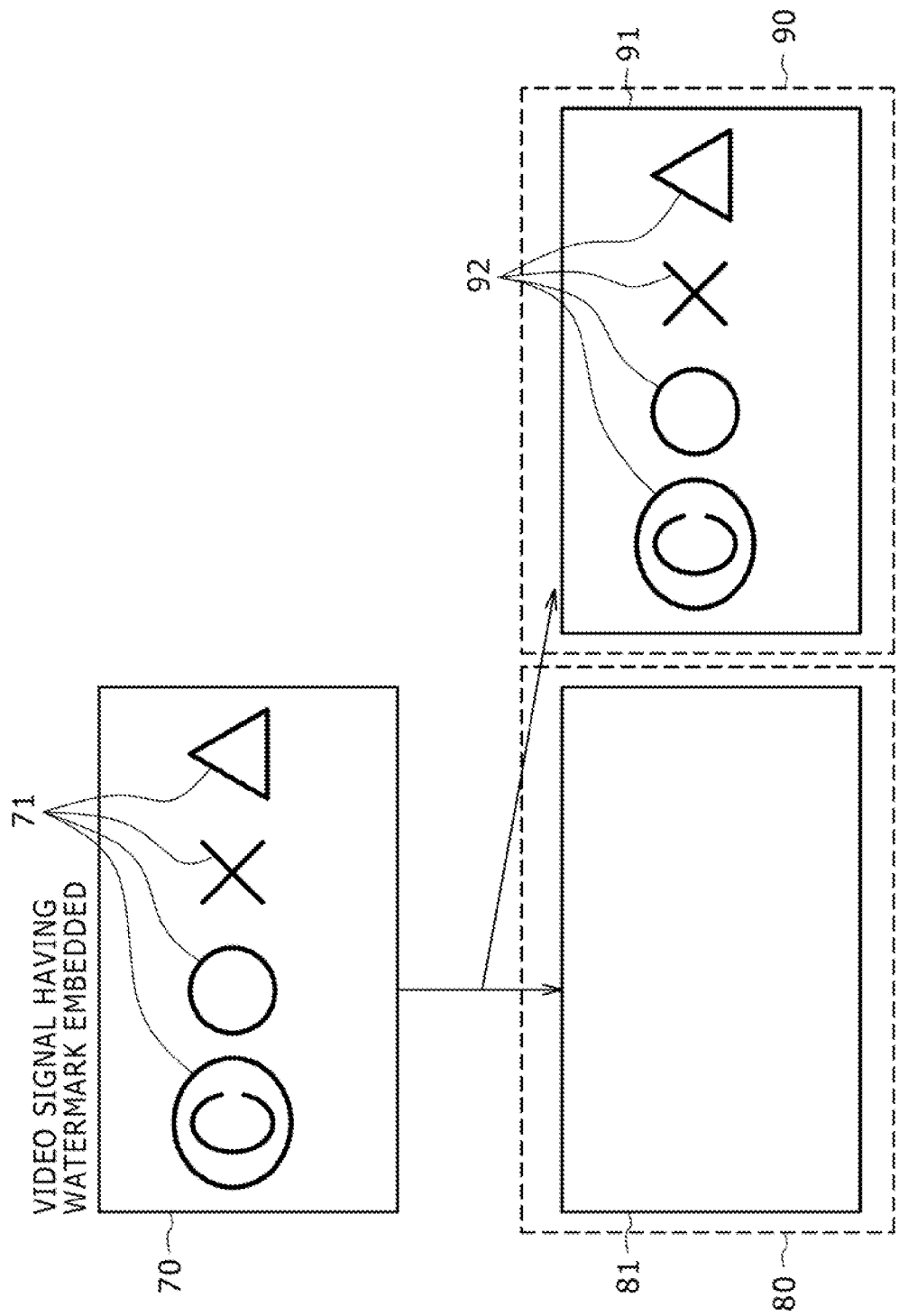
FIG. 7 is an explanatory diagram showing an example of the embedding of a watermark, according to the embodiment of the invention.

FIG. 7 shows an example of embedding a watermark in a video signal. As shown in FIG. 7, a watermark 71 such as a figure and a character that can be recognized as video is embedded in a video signal 70. In the case where the video signal 70 is transmitted to a display apparatus 80 having established display capability (i.e., capability of displaying the color gamut of the sRGB signal), the watermark 71 exists in a region beyond the color reproduction capability of the display apparatus 80; therefore, the watermark 71 is not displayed on a display screen 81. On the other hand, in the case where the video signal 70 is transmitted to a display apparatus 90 having the capability of displaying the xvYCC signal, a watermark 92 superimposed by the source device is displayed on a display screen 91. The watermark 92 is displayed with a change in color beyond the color gamut of the sRGB signal in the surrounding part corresponding to a color beyond the color gamut of the sRGB signal and with a change to a color having substantially the same hue as that of video to be represented, which leads to a relatively inconspicuous change in color and minimal effect on display image quality. In the color space shown in FIG. 6, the embedding of the watermark is performed on a color in a region outside the rhombic cuboid indicative of the color gamut of the sRGB signal, with a change to a color having substantially the same hue.

Thus, the embedding of the watermark can be performed excellently without affecting a display image or with minimal image degradation. The addition of the watermark does not increase the amount of transmission data. The embedding of e.g. copyright protection data as the watermark enables excellent copyright protection. Supplemental information, pertaining to video data, other than copyright protection data may be embedded in the form of such a watermark.

In the example of FIG. 7, a relatively simple watermark such as a figure is embedded; however, more sophisticated processing for embedding data may be performed. For example, dither processing for slightly changing a color level may be performed.

Figure 8:
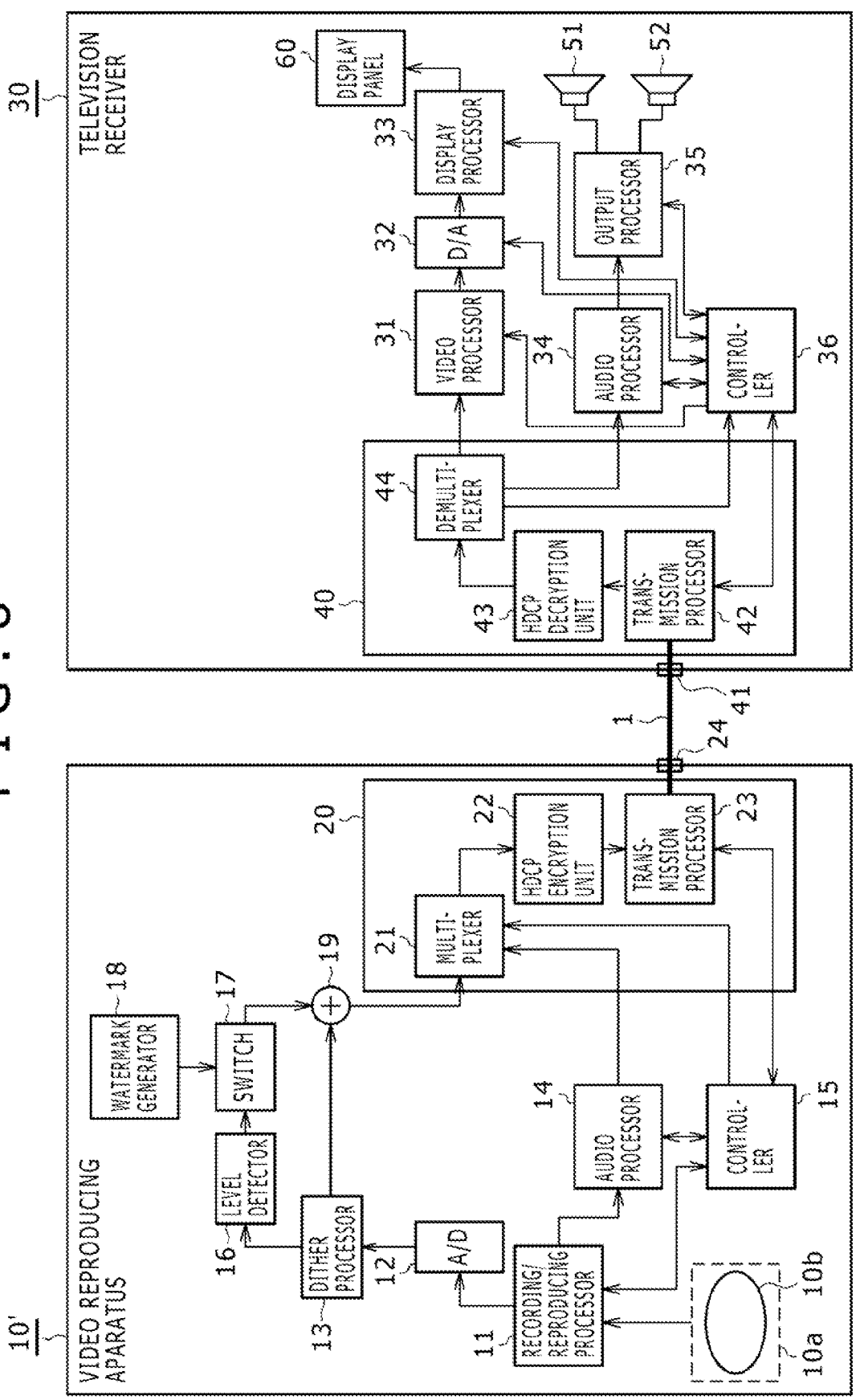
FIG. 8 is a block diagram showing an example of a system configuration according to another embodiment of the invention.

FIG. 8 shows a transmission configuration in this case. The points of difference between the configurations of FIG. 1 and FIG. 8 will be described. In a video reproducing apparatus 10', video data digitized by the analog-to-digital converter 12 or digitized video data supplied from the recording/reproducing unit 11 is supplied to a dither processor 13. The dither processor 13 slightly changes the level of a portion on which a watermark should be superimposed in the section corresponding to a color beyond the color gamut of the sRGB signal, with a change in color beyond the color gamut of the sRGB signal. If the color of a supplied video section (area) is beyond the color gamut of the sRGB signal, the level detector 16 detects the supplied section (area). The color-difference signals of the detected section are supplied to the switch 17.

Then, when the level detector 16 detects a section of which color is beyond the color gamut of the sRGB signal, control is performed so that the switch 17 outputs a watermark prepared by the watermark generator 18 in the section supplied to the switch 17. The watermark outputted from the switch 17 is supplied to the adder 19 where it is added to an output from the dither processor 13 to generate transmission video data having the watermark added by dithering. The other parts are the same as those of FIG. 1.

FIG. 9 shows an example of dithering. In the case where as shown on the left side of FIG. 9 the section corresponding to a color, as a pixel color 101 in video 100 before being dithered, beyond the color gamut of the sRGB signal is detected, a dither-a color 111 and a dither-b color 112 are alternately provided for each specified pixel to produce the original color on average as shown on the right side of FIG. 9. In this case, depending on the original color, either the color of dither a or the color of dither b may fall within the color gamut of the SRGB signal. The embedding of a watermark in this way enables more inconspicuous and excellent embedment.

In the example of dithering in FIGS. 8 and 9, the embedding of the watermark by dithering is performed in a section beyond the color gamut of the sRGB signal. However, dithering may be performed in a section within the color gamut of the sRGB signal.

More specifically, supplemental data such as the watermark may be embedded by dithering in which a color within the color gamut of the sRGB signal and a saturated color outside the color gamut of the sRGB signal are alternately provided for pixels of the area of a specific color detected within the color gamut of the sRGB signal so as not to change the original video color on average. In this dithering as well, the color within the color gamut of the sRGB signal and the saturated color outside the color gamut of the sRGB signal have substantially a same hue. Preferably, the color within the color gamut of the sRGB signal for dithering is located in proximity to a boundary of the color gamut of the sRGB signal to perform dithering in an inconspicuous manner.

Such dithering as shown in FIG. 9 is spatial dithering in one image. However, to perform similar dithering on the pixel of a specific position, for example, colors of sections beyond the color gamut of the sRGB signal in temporally different frames may be changed between colors having substantially a same hue.

In the above-described embodiment, the watermark is embedded in the source device. However, for example, in the case where video data having information of a wide color gamut beyond the color gamut of the sRGB signal is recorded (stored) on the disk 10b (storage medium) mounted on the disk mounting unit 10a shown in FIG. 1, video content in the disk may have supplemental data such as a watermark embedded beforehand in a section beyond the color gamut of the sRGB signal. With this, the source device does not need to embed a watermark.

In the above-described embodiment, description has been made on the example of transmission through the HDMI interface. However, the invention is applicable to other similar transmission standards capable of transmitting broadband video data. In the above example, video data is transmitted in the form of YCC color-difference signals (Y data, Cb data, Cr data). However, video data may be transmitted in the form of RGB signals capable of transmission of a wide color gamut. The source device and the sink device which are connected by the HDMI-compliant cable may be video devices other than the recording/reproducing apparatus and the television receiver shown in FIG. 1. Further, supplemental data such as a watermark can be represented regardless of whether video data is digital data or an analog signal, and therefore can be applied also in the case of transmission from the source device to the sink device through the use of an analog video transmission line.

In the above-described embodiment, description has been made on the example of the color gamut of the sRGB signal and the wider color gamut of the xvYCC signal. However, a color gamut specified by another standard may be applied. Further, in the above-described embodiment, description has been made on the example of a watermark as supplemental data. However, other data may be added in the same processing and transmitted. For example, some text data may be embedded as supplemental data and transmitted.

It should be understood by those skilled in the art that various modifications, combinations, sub-combinations and alterations may occur depending on design requirements and other factors insofar as they are within the scope of the appended claims or the equivalents thereof.

What is claimed is:

1. A non-transitory computer-readable medium tangibly embodied in a storage device encoded with instructions which, when executed on a processor, perform a transmission method for transmitting video data representing a color gamut beyond a first color gamut specified by a predetermined requirement, the transmission method comprising:
   detecting, from the video data, a section corresponding to video of a color gamut beyond the first color gamut;
   generating supplemental data pertaining to the video data; and
   embedding the supplemental data pertaining to the video data in the detected section corresponding to the video of the color gamut beyond the first color gamut, with a change to a color beyond the first color gamut, the color having substantially a same hue as that of video to be represented, the color having substantially the same hue being obtained by changing a signal to a color on a line connecting desired color coordinates to color coordinates indicative of white in a chromaticity diagram, wherein:
   the detected section includes a plurality of pixels of an original color;
   the supplemental data is embedded in the detected section by modifying the original color of each pixel such that a first dither color and a second dither color are alternately provided for each pixel;
   the first dither color and the second dither color produce the original color on average; and
   the first dither color is within the first color gamut and located in proximity to a boundary of the first color gamut.

2. The non-transitory computer-readable medium of claim 1, wherein the section is detected based on whether the section continues in the video data for a predetermined period of time.

3. The non-transitory computer-readable medium of claim 1, wherein the section is detected based on the section continuing for a predetermined period in the video data.

4. The non-transitory computer-readable medium of claim 1, wherein the section is detected based on a number of pixels in the video data corresponding to the color gamut beyond the first color gamut.

5. The non-transitory computer-readable medium of claim 1, wherein the first color gamut corresponds to a color reproduction capability of a display apparatus.

6. The non-transitory computer-readable medium of claim 1, wherein the color is changed based on a color reproduction capability of a display apparatus that receives the video data.

7. A video processing apparatus for generating video data capable of representing a color gamut beyond a first color gamut specified by a predetermined requirement, the video processing apparatus comprising:
   a memory comprising containing instructions; and a processor communicatively coupled to the memory and executing the instructions to cause:

detecting, from the video data, a section corresponding to video of a color gamut beyond the first color gamut;

generating supplemental data pertaining to the video data; and embedding the supplemental data pertaining to the video data in the detected section corresponding to the video of the color gamut beyond the first color gamut, with a change to a color beyond the first color gamut, the color having substantially a same hue as that of video to be represented, the color having substantially the same hue being obtained by changing a signal to a color on a line connecting desired color coordinates to color coordinates indicative of white in a chromaticity diagram, wherein:

the detected section includes a plurality of pixels of an original color;

the supplemental data is embedded in the detected section by modifying the original color of each pixel such that a first dither color and a second dither color are alternately provided for each pixel;

the first dither color and the second dither color produce the original color on average; and the first dither color is within the first color gamut and located in proximity to a boundary of the first color gamut.

8. The video processing apparatus according to claim 7, wherein the supplemental data is copyright protection data for the video data.

9. The video processing apparatus according to claim 7, wherein the processor further executes the instructions to cause dithering in the section corresponding to the video of the predetermined color gamut.

10. The video processing apparatus according to claim 9, wherein the section corresponding to the video of the predetermined color gamut includes a section that is not beyond the first color gamut.

11. A video processing apparatus for generating video data capable of representing a color gamut beyond a first color gamut specified by a predetermined requirement, the video processing apparatus comprising:

a memory containing instructions; and a processor communicatively coupled to the memory and executing the instructions to cause:

detecting, from the video data, a section corresponding to a predetermined color within the first color gamut;

generating supplemental data pertaining to the video data; and embedding, in the detected section, the supplemental data pertaining to the video data and corresponding to the predetermined color within the first color gamut as data dithered by a change between a color within the first color gamut and a color, beyond the first color gamut, having substantially a same hue as that of video to be represented, the color having substantially the same hue being obtained by changing a signal to a color on a line connecting desired color coordinates to color coordinates indicative of white in a chromaticity diagram, wherein:

the detected section includes a plurality of pixels of an original color;

the supplemental data is embedded in the detected section by modifying the original color of each pixel such that a first dither color and a second dither color are alternately provided for each pixel;

the first dither color and the second dither color produce the original color on average; and the first dither color is within the first color gamut and located in proximity to a boundary of the first color gamut.

12. A video transmission system comprising:

a source apparatus; and a sink apparatus in which video data representing a color gamut beyond a first color gamut specified by a predetermined requirement is transmitted from the source apparatus to the sink apparatus, wherein:

the source apparatus includes a first hardware processor;

the sink apparatus includes a second hardware processor;

using the first hardware processor, the source apparatus detects, from the video data, a section corresponding to video with a color gamut beyond the first color gamut and generates supplemental data pertaining to the video data;

the source apparatus transmits, using the first hardware processor, the video data having supplemental data pertaining to the video data embedded in a section corresponding to video of a color gamut beyond the first color gamut in the video data, with a change to a color beyond the first color gamut, the color having substantially a same hue as that of video to be represented, the color having substantially the same hue being obtained by changing a signal to a color on a line connecting desired color coordinates to color coordinates indicative of white in a chromaticity diagram;

the sink apparatus detects, using the second hardware processor, a change in color in the section corresponding to the video of the color gamut beyond the first color gamut contained in the transmitted video data, and detects the supplemental data based on the detected change;

the detected section includes a plurality of pixels of an original color;

the supplemental data is embedded in the detected section by modifying the original color of each pixel such that a first dither color and a second dither color are alternately provided for each pixel;

the first dither color and the second dither color produce the original color on average; and the first dither color is within the first color gamut and located in proximity to a boundary of the first color gamut.

13. The video transmission system according to claim 12, wherein the supplemental data is copyright protection data for the video data to be transmitted, and the sink apparatus performs copyright protection processing on the video data based on the detected copyright protection data.

* * * * *